US012802067B2

(12) United States Patent
Siegel et al.

(10) Patent No.: US 12,802,067 B2
(45) Date of Patent: Nov. 17, 2026

(54) SYSTEM AND METHODS FOR DELEGATED SIGNING

(71) Applicant: Dfns US Inc, Brooklyn, NY (US)

(72) Inventors: Joshua Siegel, Atlanta, GA (US); Cody Nicewanner, Monroe, WA (US)

(73) Assignee: DFNS US, INC., Brooklyn, NY (US)

( * ) Notice: Subject to any disclaimer, the term of this patent is extended or adjusted under 35 U.S.C. 154(b) by 75 days.

(21) Appl. No.: 18/521,478

(22) Filed: Nov. 28, 2023

(65) Prior Publication Data

US 2025/0173711 A1 May 29, 2025

(51) Int. Cl.

| | |
|---|---|
| ***G06Q 20/00*** | (2012.01) |
| ***G06Q 20/38*** | (2012.01) |
| ***G06Q 20/40*** | (2012.01) |

(52) U.S. Cl.

CPC ..... *G06Q 20/3825* (2013.01); *G06Q 20/3829* (2013.01); *G06Q 20/409* (2013.01)

(58) Field of Classification Search

None

See application file for complete search history.

(56) References Cited

U.S. PATENT DOCUMENTS

| | | | | |
|---|---|---|---|---|
| 5,825,880 | A * | 10/1998 | Sudia | G06F 21/64 713/180 |
| 6,367,009 | B1 * | 4/2002 | Davis | H04L 63/166 713/168 |
| 11,245,514 | B1 * | 2/2022 | Mao | H04L 9/3247 |
| 2004/0243811 | A1 * | 12/2004 | Frisch | H04L 9/3297 713/176 |
| 2005/0120217 | A1 * | 6/2005 | Fifield | H04L 9/3297 713/176 |
| 2008/0005037 | A1 * | 1/2008 | Hammad | G06Q 20/382 705/67 |
| 2017/0083867 | A1 * | 3/2017 | Saxena | G06Q 10/103 |
| 2020/0019715 | A1 * | 1/2020 | Malliah | G06F 21/64 |
| 2020/0084049 | A1 * | 3/2020 | Lindell | H04L 9/085 |

(Continued)

FOREIGN PATENT DOCUMENTS

WO WO 2021/243043 12/2021

OTHER PUBLICATIONS

Dalskov; Two-Factor Encryption for Cloud Storage; ETH Zurich; 18 pages; 2020.*

(Continued)

*Primary Examiner* — Radu Andrei

(74) *Attorney, Agent, or Firm* — NIXON & VANDERHYE P.C.

(57) ABSTRACT

Some embodiments are directed to an improved system for delegated signing, comprising one or more end user devices, one or more application provider servers and a signing system. An end user device may initiate a transaction associated with the end user device. Before the transaction can be processed, a signature is needed on a message derived from the transaction data. The message may be signed by a plurality of signing devices using a multi-party signing algorithm. A signing system may instruct a plurality of signing devices to sign the message. Before the signing system may so instruct, the system may have an authentication challenge signed by the end user device. The signing system further may verify whether the end user device is authorized to perform the transaction.

16 Claims, 8 Drawing Sheets

(56) References Cited

U.S. PATENT DOCUMENTS

| | | | | |
|---|---|---|---|---|
| 2023/0252456 | A1* | 8/2023 | Rapowitz | G06Q 20/3674 705/71 |
| 2023/0254167 | A1* | 8/2023 | Duong | G06F 21/44 713/168 |

OTHER PUBLICATIONS

Elizabeth Crites et al, "Fully Adaptive Schnorr Threshold Signatures", Proceedings of Crypto 2023, https://eprint.iacr.org/2023/445, Mar. 27, 2023.
Découvrez la Legacy Collection, Molitor, https://nft.molitorparis.com/nfts, Sep. 1, 2023.
SPA interacting with Dfns API, Dfns, https://github.com/dfnsext/typescript-sdk/tree/rn/examples/sdk/auth-direct, Jul. 31, 2023.
Schnorr signature, Wikipedia, https://en.wikipedia.org/wiki/Schnorr_signature, Feb. 1, 2004.
EdDSA, Wikipedia, https://en.wikipedia.org/wiki/EdDSA, Oct. 12, 2013.
Digital Signature Algorithm, Wikipedia, https://en.wikipedia.org/wiki/Digital_Signature_Algorithm, Jun. 25, 2022.
Elliptic Curve Digital Signature Algorithm, Wikipedia, https://en.wikipedia.org/wiki/Elliptic_Curve_Digital_Signature_Algorithm, Feb. 1, 2004.
BLS digital signature, Wikipedia, https://en.wikipedia.org/wiki/BLS_digital_signature, Jul. 20, 2008.
Crypto Security Firm Dfns Adds Biometric Support to Wallet Development Toolkit, CoinDesk, https://www.coindesk.com/tech/2023/5/09/crypto-security-firm-dfns-adds-biometric-support-to-wallet-developmenttoolkit, May 9, 2023.
Delete a Whitelisted Address from an internal Wallet, Fireblocks, https://docs.fireblocks.com/api/#delete-a-whitelisted-address-form-an-internal-wallet, Dec. 2, 2020.
Generating a CSR file, Fireblocks, https://docs.fireblocks.com/api/#generating-a-csr-file, Dec. 2, 2020.
Fast Multiparty Threshold ECDSA with Fast Trustless Setup, Cryptology ePrint Archive, https://eprint.iacr.org/2019/114, Feb. 7, 2019.
Guide to Web Authentication, WebAuthn, https://webauthn.guide, Oct. 1, 2018.
Webauthn-open-source/fido2-lib, GitHub, https://github.com/webauthn-open-source/fido2-lib, Jul. 27, 2018.
Bitcoin core developer claims to have lost $200_+$ BTC in hack, CoinTelegraph, https://cointelegraph.com/news/bitcoin-core-developer-claims-to-have-loast-200-btc-in-hack, Jan. 2, 2023.
AWS Nitro Enclaves, AWS, https://aws.amazon.com/ec2/nitro/nitro-enclaves, Dec. 5, 2019.
International Search Report and Written Opinion of the International Searching Authority, PCT/US2024/055874, Mar. 4, 2025.
Dfsn: "dfns/dfns-api-docs", https://github.com/dfns/, XP093252044, Nov. 27, 2023, pp. 1-48.
Kzen Team: "Bitcoin Wallet Powered by Two-Party ECDSA-Extended Abstract", https://github.com/ZenGo-X/, Jan. 19, 2019, pp. 1-8.
Herranz Javier et al: "Verifiable Secret Sharing for General Access Structures, with Application to Fully Distributed Proxy Signatures", Financial Cryptography, vol. 2742, pp. 286-302, Jan. 30, 2003.

* cited by examiner

SYSTEM AND METHODS FOR DELEGATED SIGNING

TECHNICAL FIELD

The presently disclosed subject matter relates to a system for delegated signing, an end user device, an application provider server, a signing system, a delegated signing method for an end user device, a delegated signing method for an application provider server, a delegated signing method for a signing system, a computer readable medium.

BACKGROUND

Wallet infrastructure is used for many applications, e.g., from banks to gaming studios.

Signatures that are needed from a client to approve transactions may be created by advanced cryptography such as a Threshold Signature Scheme (TSS). The signers may hold key shares created via Distributed Key Generation (DKG) and sign transactions verified through Zero-Knowledge Proofs (ZKP) by communicating over encrypted channels.

Unfortunately, the complexity of blockchains and key management hinder fast development, and may also lead to unintended errors, as non-experts in cryptography are tasked with such areas.

Furthermore, a service offered may require for some to be a crypto-custodian, so that a high grade of security for assets, such as digital currencies, is needed.

There is a need to improve the ability to offer signatures, e.g., for blockchain applications, and/or to build wallet services.

SUMMARY

An improved system for delegated signing is described in the accompanying claims. Specific embodiments of the invention are set forth in the dependent claims.

In an embodiment of the system for delegated signing, the system may comprise one or more end user devices, one or more application provider servers and a signing system.

An end user device may initiate a transaction associated with the end user device. These transactions may include transactions of various types. For example, they may include transactions involving transfer tokens, transactions involving contracts, such as transactions calling arbitrary smart contract functions, and/or transactions on cryptocurrency amounts associated with the end user, e.g. via accounts on which cryptocurrency amounts associated with the end user are stored. In here, various cryptocurrencies may be used by the embodiment that need a signature from the end user device. Before the transaction can be processed, a signature is needed on a message derived from the transaction data. For example, such a message and signature may be forwarded to a system for processing transactions, which may be a distributed ledger, or the like.

Interestingly, the private key corresponding to the end user device with which the message is to be signed need not be stored at the end user device—in fact, it is preferable that it is not. Instead, the message may be signed by a plurality of signing devices using a multi-party signing algorithm. A signing system may instruct a plurality of signing devices to sign the message.

Before the signing system may so instruct, the system may have an authentication challenge signed by the end user device. In this way, the end user device retains the ability to control whether or not a transaction will be signed with their key or not, even though the signing key or key share(s) may not be stored at the end user device, and may even be inaccessible thereby.

The signing system further may verify whether the end user device is authorized to perform the transaction. The signing system need not communicate directly with the end user device, but instead may communicate through an application provider server.

Several advantages are associated with the system for delegated signing.

Security is improved, because the end user device does not need to store the signing keys with which transaction messages are signed. End user devices are notorious for low security, and are often a victim of viruses and other malicious software. Since the actual signing key for transactions is not stored locally, security of this important key is increased.

The end user device still has a private key; however, it is not used to sign a transaction, but to signal a signing intent to the application provider server and/or signing system. Outside the system for delegated signing, this key of the end user device holds no relevance. Accordingly, the system may create its own system for managing this key, e.g., for recovery in case of loss or the like. For example, an end user device may be issued a new key based on a know your customer (KYC) procedure. Below a more advanced key recovery procedure is described that is enabled by the system, where this signing key, if compromised, needs only be blocked in this particular system, e.g., blacklisted.

Furthermore, an intermediate is created in the form of an application provider server, which makes it easy to offer advanced signing services without having to invest in a signing system. Indeed, advanced cryptography, such as multi-party signing algorithms, offers high security, but also creates higher complexity. Such higher complexity makes this system hard to implement. An application provider server makes it possible to have both ease of development and of high security. For example, a company may integrate an application provider server in its product. Moreover, an application provider server may avoid becoming a custodial, and thus incurs the high costs of a high grade of security for assets.

In an embodiment, the end user device comprises an asymmetric key pair for signing authentication challenges. An improved recovery system for the asymmetric key pair is provided. The end user device may encrypt a recovery private key using a recovery symmetric key created on the end user device. The encrypted recovery private key and corresponding recovery public key may be stored externally, e.g., at the application provider server. After a loss or the like at the end user device, so that the recovery private key is needed, the application provider server may send the encrypted recovery private key and a challenge to the end user device. Since the end user device has the recovery symmetric key, the encrypted recovery private key may be decrypted and the challenge signed. By verifying the signed challenge, the application provider server may verify that the end user device indeed has access to the recovery private key.

This elegant protocol provides an efficient way to allow automated recovery in case of an accident at the end user device. The recovery symmetric key may be stored by the end user on multiple end user devices, or in another type of back-up, e.g., on paper.

The system for delegated signing is an electronic system. The end user device, application provider server, signing system and signing device are electronic devices; they may comprise a computer.

The method of delegated signing described herein may be applied in a wide range of practical applications, whenever high security signing is needed but no correspondingly high security device is available.

A further aspect are methods for delegated signing. An embodiment of the method may be implemented on a computer as a computer implemented method, or in dedicated hardware, or in a combination of both. Executable code for an embodiment of the method may be stored on a computer program product. Examples of computer program products include memory devices, optical storage devices, integrated circuits, servers, online software, etc. Preferably, the computer program product comprises non-transitory program code stored on a computer readable medium for performing an embodiment of the method when said program product is executed on a computer.

In an embodiment, the computer program comprises computer program code adapted to perform all or part of the phases of an embodiment of the method when the computer program is run on a computer. Preferably, the computer program is embodied on a computer readable medium.

Another aspect of the presently disclosed subject matter is a method of making the computer program available for downloading. This aspect is used when the computer program is uploaded, and when the computer program is available for downloading.

BRIEF DESCRIPTION OF DRAWINGS

Further details, aspects, and embodiments will be described, by way of example only, with reference to the drawings. Elements in the figures are illustrated for simplicity and clarity and have not necessarily been drawn to scale. In the figures, elements which correspond to elements already described may have the same reference numerals. In the drawings, FIG. 1*a* schematically shows an example of an embodiment of an end user device, FIG. 1*b* schematically shows an example of an embodiment of an application provider server, FIG. 1*c* schematically shows an example of an embodiment of a signing system, FIG. 1*d* schematically shows an example of an embodiment of a system for delegated signing, FIG. 1*e* schematically shows an example of an embodiment of a signing system, FIG. 2 schematically shows an example of a sequence diagram for a system for delegated signing, FIG. 3*a* schematically shows an example of an embodiment of an end user device with a key storage, FIG. 3*b* schematically shows an example of an embodiment of an end user device connected to a signing device, FIG. 4*a* schematically shows an example of a sequence diagram for a system for recovery of access to an account on which transactions can be made, FIG. 4*b* schematically shows an example of an embodiment of an end user device and an application provider server, FIG. 5 schematically shows an example of an architecture of a system for delegated signing, FIG. 6*a* schematically shows an example of an embodiment of a delegated signing method for an end user device, FIG. 6*b* schematically shows an example of an embodiment of a delegated signing method for an application provider server, FIG. 6*c* schematically shows an example of an embodiment of a delegated signing method for a signing system, FIG. 7*a* schematically shows a computer readable medium having a writable part comprising a computer program according to an embodiment, FIG. 7*b* schematically shows a representation of a processor system according to an embodiment.

REFERENCE SIGNS LIST

Figure 1A:
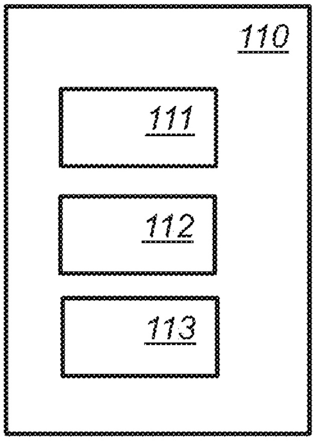

The following list of references and abbreviations corresponds to FIGS. 1-7*b*, and is provided for facilitating the interpretation of the drawings and shall not be construed as limiting the claims.

100 system for delegated signing
110, 110.1,110.2,110.3 end user device
111 processor
112 memory
113 communication interface
120, 120.1,120.2 application provider server
121 processor
122 memory
123 communication interface
130 signing system
130.1,130.2,130.3 signing device
131 processor
132 memory
133 communication interface
134.1,134.2,134.3 key share
150 computer network
151 communication server
200 sequence diagram for system for delegated signing
201 initiating transaction
202 obtaining transaction data and verifying transaction request
203 forwarding transaction data
204 receiving transaction data and obtaining authentication challenge
205 sending authentication challenge
206 receiving authentication challenge
207 forwarding authentication challenge
208 receiving and signing authentication challenge
209 returning signed authentication challenge
210 receiving signed authentication challenge
211 sending signed authentication challenge
212 receiving signed authentication challenge, verifying whether it is correctly signed and authorization of the end user device for the transaction
213 instructing to sign transaction data
214 signing transaction data
215 returning signed authentication challenge to signing system
301 private key
302 public key
310,310.1 end user device
312,313 key storage
340 external signing device
400 sequence diagram for a system for recovery of access to an account on which transactions can be made
401 encrypting recovery private key
402 sharing encrypted recovery private key
403 storing encrypted recovery private key and recovery public key

404 sharing the encrypted recovery private key and sending recovery challenge
405 decrypting recovery private key, signing recovery challenge and signing replacement public key, also referred to as new public key
406 sending signed recovery challenge and replacement public key
407 validating signed recovery challenge and replacing original public key, also referred to as first public key, with replacement public key
411 recovery symmetric key
412 recovery public key
413 encrypted recovery private key
431 set-up phase
432 recovery phase
500 architecture for system for delegated signing
510 end user device
520 application provider server
531 wallet provider authentication layer
532 wallet provider authorization layer
533 wallet provider coordination layer
534.1,534.2,534.3 signer network provider
610 delegated signing method for an end user device
611 initiating transaction
612 receiving authentication challenge
613 signing authentication challenge
614 returning signed authentication challenge
620 delegated signing method for an application provider server provider
621 obtaining transaction data
622 forwarding transaction data
623 receiving authentication challenge
624 forwarding authentication challenge
625 receiving signed authentication challenge
626 sending signed authentication challenge
630 delegated signing method for a signing system
631 receiving transaction data
632 sending authentication challenge
633 receiving signed authentication challenge
634 verifying whether authentication challenge is correctly signed
635 verifying whether end user device is authorized to perform transaction
636 instructing signing devices to sign transaction data
1000, 1001 computer-readable medium
1010, 1020 stored data
1110 processor system
1120 processing unit
1122 memory
1124 dedicated integrated circuit
1126 communication element
1130 interconnect

DESCRIPTION OF EMBODIMENTS

While the presently disclosed subject matter is susceptible of embodiment in many different forms, there are shown in the drawings and will herein be described in detail one or more specific embodiments, with the understanding that the present disclosure is to be considered as exemplary of the principles of the presently disclosed subject matter and not intended to limit it to the specific embodiments shown and described.

In the following, for the sake of understanding, elements of embodiments are described in operation. However, it will be apparent that the respective elements are arranged to perform the functions being described as performed by them.

Further, the subject matter that is presently disclosed is not limited to the embodiments only, but also includes every other combination of features described herein or recited in mutually different dependent claims.

Figure 1B:
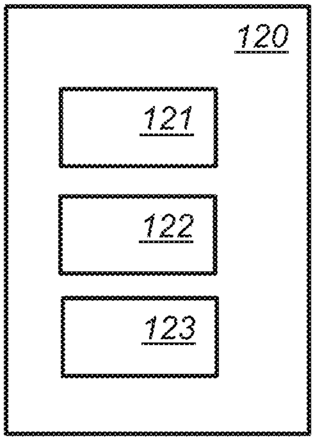
Figure 1C:
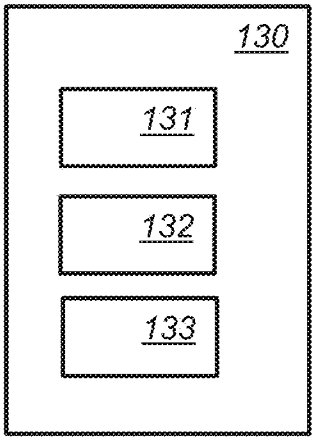

FIG. 1*a* schematically shows an example of an embodiment of an end user device 110, FIG. 1*b* schematically shows an example of an embodiment of an application provider server 120. FIG. 1*c* schematically shows an example of an embodiment of a signing system 130.

Figure 1D:
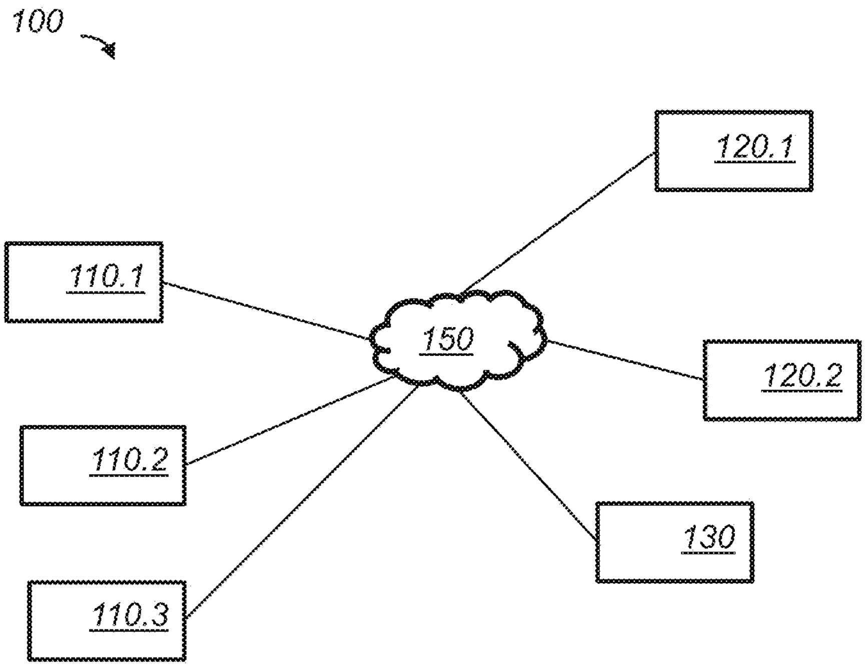
Figure 1E:
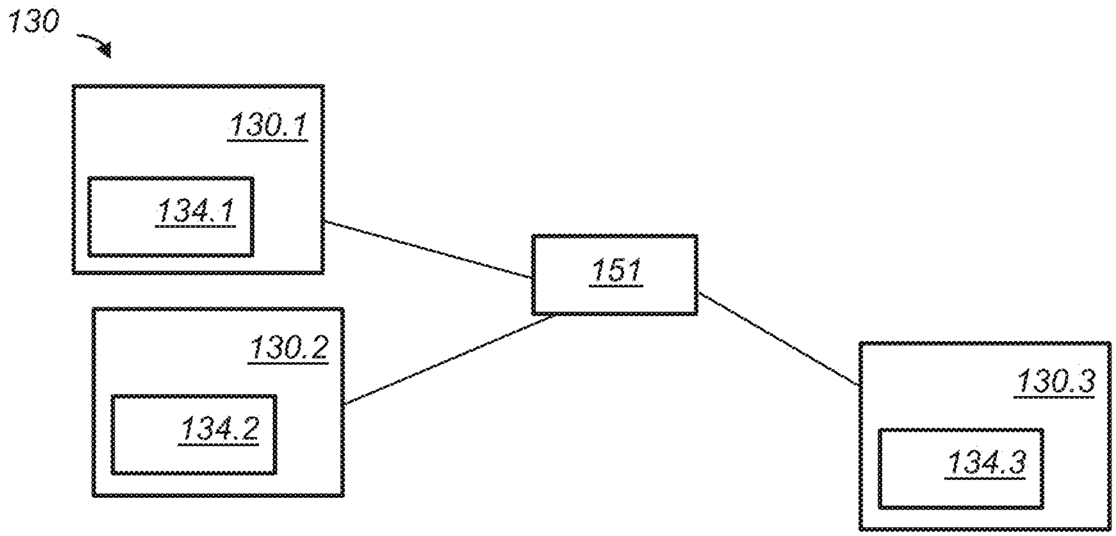

End user device 110, application provider server 120 and signing system 130 may be part of a system 100, shown further in FIG. 1*d*. For example, the system 100 may be used to delegate custody of signing keys for signing transactions, and/or to transfer and/or recover accounts on which transactions can be made and/or access to blockchain-based assets. This delegation of custody may then alleviate the burden Digital Asset Service Provider (DASP) licenses bring, as it may now be shown that only end users may execute transactions, e.g. on chain. Here, transactions may comprise many types of transactions: on cryptocurrencies. NFTs, in staking, Decentralized Autonomous Organization (DAO) voting, Risk-Weighted Asset (RWA) tokenization, etc.

End user device 110 may be configured to initiate and sign transactions for end users without the need to store the signing keys for signing a transaction. Note that end user device 110 may store a signing key for approving the signing of a transaction by the signing system. Application provider server 120 may be configured to offer the service of storing signing keys for end users. Signing system 130 may be configured to validate authentication and authorization of end users for performing transactions.

End user device 110 may comprise a processor system 111 comprising one or more processors, a storage 112 comprising one or more storage devices, and a communication interface 113. Application provider server 120 may comprise a processor system 121 comprising one or more processors, a storage 122 comprising one or more storage devices, and a communication interface 123. Signing system 130 may comprise a processor system 131 comprising one or more processors, a storage 132 comprising one or more storage devices, and a communication interface 133.

In the various embodiments of communication interfaces 113, 123 and/or 133, the communication interfaces may be selected from various alternatives. For example, the interface may be a network interface to a local or wide area network, e.g., the Internet, a storage interface to an internal or external data storage, an application interface (API), etc.

Storage 112, 122 and 132 may be, e.g., electronic storage, magnetic storage, etc. The storage may comprise local storage, e.g., a local hard drive or electronic memory. Storage 112, 122 and 132 may comprise non-local storage, e.g., cloud storage. In the latter case, storage 112, 122 and 132 may comprise a storage interface to the non-local storage. Storage may comprise multiple discrete sub-storages together making up storage 112, 122, 132. Storage may comprise a volatile writable part, say a RAM, a non-volatile writable part, e.g., Flash, a non-volatile non-writable part, e.g., ROM.

Storage 112, 122 and 132 may be non-transitory storage. For example, storage 112, 122 and 132 may store data in the presence of power such as a volatile memory device, e.g., a Random Access Memory (RAM). For example, storage 112, 122 and 132 may store data in the presence of power as well as outside the presence of power such as a non-volatile memory device, e.g., Flash memory.

The devices 110, 120 and 130 may communicate internally, with each other, with other devices, external storage, input devices, output devices, and/or one or more biometric sensors over a computer network. The computer network may be an internet, an intranet, a LAN, a WLAN, etc. The computer network may be the Internet. The devices 110, 120 and 130 comprise a connection interface which is arranged to communicate within system 100 or outside of system 100 as needed. For example, the connection interface may comprise a connector, e.g., a wired connector, e.g., an Ethernet connector, an optical connector, etc., or a wireless connector, e.g., an antenna, e.g., a Wi-Fi, 4G or 5G antenna.

The communication interface 113 may be used to send or receive digital data, e.g., transaction data describing transactions, authentication challenges corresponding to transactions, recovery challenges and key pairs. The communication interface 123 may be used to send or receive digital data, e.g., transaction data describing transactions, authentication challenges corresponding to transactions, recovery challenges and key pairs. The communication interface 133 may be used to send or receive digital data, e.g., transaction data describing transactions, authentication challenges corresponding to transactions, key shares and signatures.

The communication interface 123 may be used to communicate with other server devices, e.g., external server devices with which combined signatures may be shared, when they are not returned to the end user device 110; then the application provider server 120 may be further configured to send the transaction data and the combined signature to an external service interface 130.1 via the communication interface 123.

The execution of devices 110, 120 and 130 may be implemented in a processor system. The devices 110, 120 and 130 may comprise functional units to implement aspects of embodiments. The functional units may be part of the processor system. For example, functional units shown herein may be wholly or partially implemented in computer instructions that are stored in a storage of the device and executable by the processor system.

The processor system may comprise one or more processor circuits, e.g., microprocessors, CPUs, GPUs, etc. Devices 110, 120 and 130 may comprise multiple processors. A processor circuit may be implemented in a distributed fashion, e.g., as multiple sub-processor circuits. For example, devices 110, 120 and 130 may use cloud computing via a cloud server 150.

Typically, the end user device 110, application provider server 120 and signing system 130 each comprise a microprocessor which executes appropriate software stored at the device; for example, that software may have been downloaded and/or stored in a corresponding memory, e.g., a volatile memory such as RAM or a non-volatile memory such as Flash.

Instead of using software to implement a function, the devices 110, 120 and/or 130 may, in whole or in part, be implemented in programmable logic, e.g., as field-programmable gate array (FPGA). The devices may be implemented, in whole or in part, as a so-called application-specific integrated circuit (ASIC), e.g., an integrated circuit (IC) customized for their particular use. For example, the circuits may be implemented in CMOS, e.g., using a hardware description language such as Verilog, VHDL, etc. In particular, end user device 110, application provider server 120 and signing system 130 may comprise circuits, e.g., for cryptographic processing, and/or arithmetic processing.

In hybrid embodiments, functional units are implemented partially in hardware, e.g., as coprocessors, e.g., cryptographic coprocessors, and partially in software stored and executed on the device.

FIG. **1*d* schematically shows an example of an embodiment of a system 100 for delegated signing. System 100 may comprise multiple end user devices; shown are end user devices 110.1, 110.2,110.3, but it can be more or fewer than three. System 100 may comprise multiple application provider servers; shown are application provider server 120.1 and 120.2, but it can be more or fewer than two. All of end user devices 110.1, 110.2, 110.3 may communicate with all of application provider servers 120.1,120.2, or any subgroup of end user devices 110.1,110.2, 110.3 may communicate with any subgroup of application provider servers 120.1, 120.2. The devices may be connected through a computer network 150**, e.g., the Internet. The end user device and application provider server may be according to an embodiment.

FIG. **1*e* schematically shows an example of an embodiment of a signing system 130. Signing system 130 may comprise multiple signing devices; shown are signing devices 130.1, 130.2 and 130.3. All signing devices 130.1, 130.2,130.3 may communicate with each other: so device 130.1 may communicate with devices 130.2 and 130.3, device 130.2 may communicate with devices 130.1 and 130.3, and device 130.3 may communicate with devices 130.1 and 130.2; or any subgroup of signing devices 110.1, 110.2,110.3 may only communicate inside the subgroup: e.g., signing devices 130.1, 130.2 may communicate only with each other, and signing device 130.3 may not communicate with the other devices 130.1 and 130.2. The devices may be connected through a communication server 151, e.g., via the Internet. The signing devices may be according to an embodiment. Signing system 130 may be configured to create key shares 134.1,134.2, 134.3, via distributed key generation or a trusted party, configured for a threshold signature scheme, and to distribute key shares 134.1,134.2, 134.3 to signing devices 130.1,130.2,130.3. Signing devices 130.1,130.2,130.3 may comprise key storages, storing a key share 134.1, 134.2, 134.3. Signing system 130 may be configured to sign, as well as coordinate and organize the signing and generation of signing challenges, internally in the system itself, and/or externally in external devices for signing and/or generation for signing challenges. Communication server 151** may also serve as a means of communication for the coordination and/or organization of the signing and generation of signing challenges.

Signing system 130 may be configured to execute in a set-up phase a distributed key generation. Signing system 130 may create a plurality of key shares 134.1, 134.2, 134.3, which may be configured for a threshold signature scheme. Signing system 130 may distribute the plurality of key shares 134.1,134.2,134.3 to the plurality of signing devices 130.1, 130.2, 130.3. Key shares 134.1, 134.2, 134.3 may be created by an external key generating device, and/or distributed by an external key distributing device: the key shares may then be imported. Signing device 130.1, 130.2, 130.3 may store a key share of the plurality of key shares 134.1, 134.2, 134.3 in a key storage. Signing device 130.1,130.2, 130.3 may comprise one or more processors, and one or more storage devices. The one or more processors may retrieve the key share 134.1,134.2,134.3, and generate a corresponding signature share. Signing system 130 may be configured to combine a plurality of signature shares generated by signing devices 130.1,130.2,130.3 into a combined signature. The combined storage may correspond to a threshold signature scheme. The plurality of signature shares may be combined with an external device.

Figure 2:
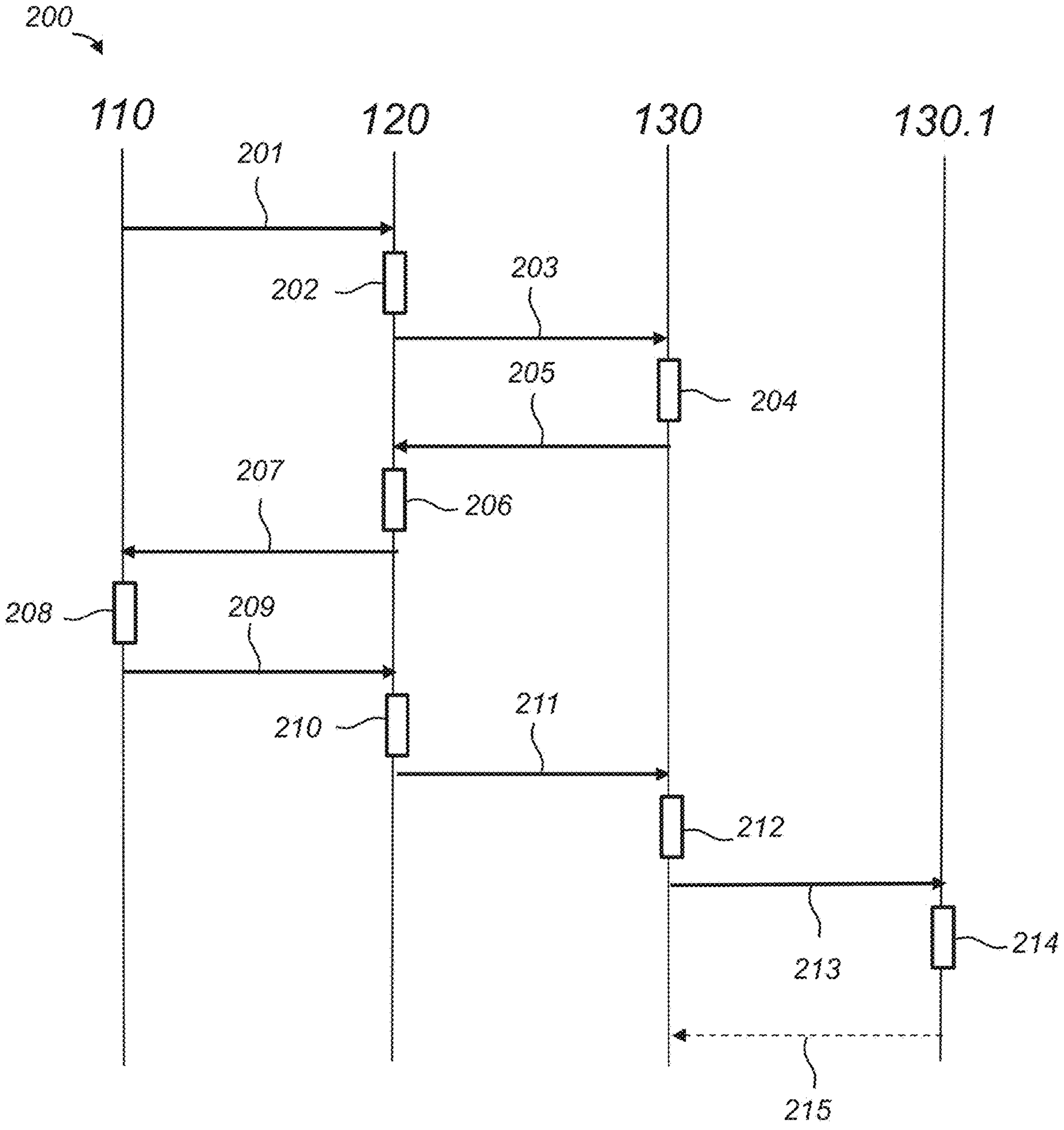

FIG. 2 schematically shows an example of a sequence diagram 200 for a system for delegated signing. FIG. 2 shows an end user device 110, an application provider server 120, a signing system 130, and an, optionally external, signing device 130.1. For example, these devices and systems could be as described with reference to FIGS. 1*a*-1*e*. End user device 110, application provider server 120, signing system 130, and external signing device 130.1 may be configured to communicate with each other over an authenticated channel, and preferably, also a confidential channel.

End user device 110 may be configured to initiate a transaction associated with the end user device 110. For example, a wallet, also known as a digital wallet, may be used to hold an account on which transactions may be made for an end user associated with end user device 110. End user device 110 may access a digital wallet via a wallet-onboarding interface, such as an in-app wallet, on an application using their phone. The wallet onboarding interface may be of a web3 type, such as an open-source blockchain, or of a web2 type, such as the more social-based Meta-type or https://nlt.molitorparis.com/nfts, where NFTs may be purchased, e.g. using ETH coins.

Initiating the transaction may comprise sending a message 201 to application provider server 120 expressing the intent for a transaction, e.g., comprising the transaction data. The transaction data may comprise one or more of an identification number associated with the end user, an identification number associated with an account with which the transaction may be associated, and data associated with the transaction itself, etc. The transaction may comprise a type of action on the account, e.g., on a cryptocurrency amount in the case the account is a cryptocurrency account; in particular, an amount of value, such as an amount of valuta, to be disposed or taken from the cryptocurrency amount.

The communication between end user device 110 and application provider server 120 preferably happens through an authenticated channel, such as HTTPS. For example, end user device 110 may generate an authentication token such as a signature, which may be generally different from signatures associated with private key 301 of the end user device, which is part of a public/private key pair belonging to end user device 110, and send it to application provider server 120, e.g., together with message 201. End user device 110 may comprise multiple private keys, and/or multiple public/private key pairs, e.g., to create an authenticated channel through which end user device 1000 may communicate with application provider server 120, and/or to generate signatures. End user device 110 may send a signature and an authentication request, which may comprise an authentication token, to application provider server 120.

As an end user or as an end user device, the authentication token may be created, e.g., using a personal log-in, or using a personal access token, etc. Note that an authentication token does not need to be personal, e.g., in case of a service account token. In an embodiment, the authentication token may be generated at the end user device 110, e.g., using a private key stored at said device. In another embodiment, the authentication token may be generated external to the end user device 110, e.g., at an authentication token generator device.

Application provider server 120 may be configured to receive message 201. In response, application provider server 120 may perform action 202 that comprises obtaining transaction data describing the transaction and verifying the transaction request. Transaction data may be obtained from end user device 110, e.g., in message 201, and/or may be retrieved or generated by application provider server 120 itself.

The transaction data that may have been shared with the application provider server may comprise, e.g., an identification number associated with the end user and/or end user device, but the application provider server may also be able to obtain this information or part thereof by retrieving this data, for example, from a database storing profile information of users, a template, or a type of an overview such as a table, etc. Accordingly, the application provider server 120 may be able to generate transaction data or parts of transaction data without the use of end user device 110.

Verifying the transaction request may also happen, e.g., using such a database, template, or overview, etc. At this stage an authentication token in message 201 may be verified, but this may also be done later by signing system 130. Application provider server 120 may generate a service account token for use with the transaction signing, which may be included in future messages.

Once application provider server 120 has collected the transaction data, this data is sent to signing system 130 in message 203. Signing system 130 may thus obtain what the application provider server 120 may have obtained during action 202. Signing system 130 may verify message 203, e.g., by verifying the authentication token in message 201 as discussed above. Signing system 130 may verify properties of message 203 such as one or more of size and type of the data.

Signing system 130 may be configured to receive message 203 including the transaction data. In response, signing system 130 may perform action 204 that comprises obtaining an authentication challenge therefor. Obtaining an authentication challenge may comprise generating an authentication challenge. Generating this authentication challenge may take place in response to a call by, e.g., the application provider server to the backend of the party which offers the service. This creation of challenges may be coordinated and organized by signing system 130 itself. In an embodiment, signing system 130 comprises multiple signing devices, one or more of which may generate the authentication challenge. The authentication challenge may also, or instead, be created by an external authentication challenge generating device, e.g., by a trusted party, e.g., upon request by signing system 130. For example, an authentication challenge may comprise a nonce, a random number, or the like. The authentication challenge may be at least 80 bit longer, preferably, at least 128 bit long, more preferably, 256 bit long. Typically, it may be generated corresponding to a challenge-response authentication protocol.

For example, signing system 130 may store the received transaction data together with the obtained challenge, e.g., in a storage of signing system 130. Signing system 130 may store an IP address from which the transaction data has been sent. The transaction data may comprise an IP address as part of the data. Signing system 130 may store a hash corresponding to the transaction data that has been sent. The transaction data may comprise a hash as part of the data.

Signing system 130 may be configured to send the authentication challenge to the application provider server 120, in message 205.

Application provider server 120 may be configured to receive the authentication challenge from signing system 130, in action 206. Action 206 may further comprise that application provider server 120 may verify that the authentication challenge has not been used before.

Application provider server 120 may be configured to forward the authentication challenge to end user device 110 in message 207.

End user device 110 may be configured to receive from the application provider server 120 an authentication challenge for the transaction, and sign the authentication challenge in action 208 with a private key. This may comprise a private key with which messages such as messages 201 and 209 are signed; the private key with which the authentication challenge is signed may also be a different key from the private key with which messages such as messages 201 and 209 are signed. The signing may take place via generating a signature. The signing may take place using a digital signature algorithm such as one or more of RSA, DSA and ECDSA. Before signing the authentication challenge may be hashed, e.g., using a SHA hash algorithm, e.g., SHA-256.

End user device 110 may be configured to return the signed authentication challenge to application provider server 120 in message 209.

Application provider server 120 may be configured to receive the signed authentication challenge from end user device 110 in action 210. Action 210 may further comprise that application provider server 120 may verify whether the authentication challenge is signed.

Application provider server 120 may be configured to forward the signed authentication challenge to signing system 130 for authentication and authorization in message 211.

Signing system 130 may be configured to receive the signed authentication challenge from application provider server 120. Signing system 130 may then verify whether the authentication challenge is correctly signed. The verifying of the authentication challenge may further comprise checking in a storage of signing system 130 if the signed authentication challenge corresponds to the authentication challenge sent in message 205. For example, the storage of signing system 130 may store the received transaction data together with the obtained authentication challenge. For example, the received transaction data may be stored in a table, which is sorted based on one or more of IP addresses, chronological order, whether or not verification has taken place, or in a hash table, sorted on the hash of the transaction data, or the like. If the challenge is not correctly signed according to the verifying whether the authentication challenge is correctly signed, signing system 130 may rejects the transaction.

Signing system 130 may be configured to verify whether the end user device 110 is authorized to perform the transaction, in action 212. For example, end user device 110 and/or a user may be identified from the authentication of the authentication challenge. The verifying of the authorization of the end user may happen using one or more of a table, a database and other types of data storage, where data on the end user and/or, e.g., an account with which the transaction is associated is stored. Verifying may take place by checking whether the data on the end user and/or data on the account agree with each other, and may confirm the end user is indeed authorized to perform the transaction to which the authentication challenge corresponds. The data on the end user and/or the account may comprise an IP address of the end user device, identification data for the end user or the end user device, identification data for a possible account, like a digital cryptocurrency amount, etc. If end user device 110 is not authorized according to the verifying whether end user device 110 is authorized, signing system 130 may reject the transaction.

Signing system 130 may be configured to instruct a plurality of transaction signing devices 130.1,1302., 130.3 through message 213 to sign the transaction data with a multi-party computation shared private key corresponding to the transaction in action 214. The transaction signing devices may hold key shares 134.1, 134.2, 134.3 which may be created using a distributed key generation, or using a trusted party, which may be configured for a threshold signature scheme. The transaction signing devices use these key shares for the signing of the transaction data. Signing system 130 may comprise the plurality of transaction signing devices. In that case, signing system 130 signs itself, and thus coordinates the signing internally. Transaction signing devices 130.1,1302., 1303. may be external signing devices. In that case, signing system 130 coordinates the signing externally. Signing the transaction in action 214 may comprise the usage of a digital signature scheme, such as ECDSA, BLS, EdDSA, which comprises the use of a digital signature, such as a Schnorr signature or a variant of a Schnorr signature, or other schemes.

Signing system 130 may be configured to provide the signed authentication challenge to signing device 130.1 or a plurality of signing devices, which may be internal or external signing devices. The one or more signing devices 130.1, 130.2, 130.3, may be configured to validate the signed authentication challenge. The validating the signed authentication challenge may be the same as the verifying whether the authentication challenge is correctly signed, and/or the verifying of the authorization, which may be as described above.

The signed authentication challenge may be returned to signing system 130 by signing device 130.1 in message 215, in the case in which signing device 130.1 is not part of signing system 130. An additional validation procedure may then also be carried out.

Figure 3A:
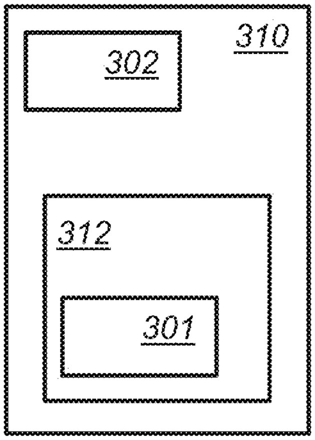

FIG. 3*a* schematically shows an example of an embodiment of an end user device 310 with a key storage 312, e.g., in secure hardware, such as a YubiKey. Key storage 312 may store a private key 301. Private key 301 may be associated with an asymmetric key pair 301, 302, where the asymmetric key pair may comprise private key 301 and a public key 302. End user device 310 may be configured to sign authentication challenges with private key 301, such as in action 208. The signature associated with private key 301 of the end user device may be generally different from signatures which may be generated for signing messages such as messages 201 and 209.

Figure 3B:
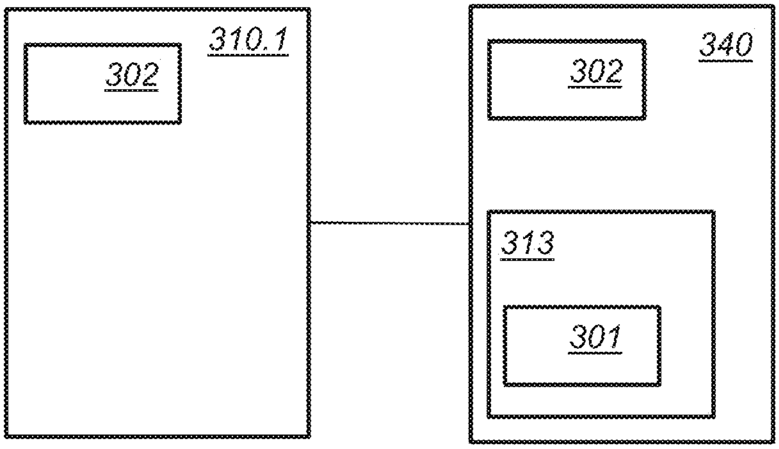

FIG. 3*b* schematically shows an example of an embodiment of an end user device 310.1 which is connected to an external signing device 340. End user device 310.1 may be configured to connect to external signing device 340 via communication interface 313. End user device 310.1 may be further configured to sign authentication challenges using external signing device 340. External signing device 340 may comprise to this end a key pair 301, 302. Key pair 301, 302 may comprise private key 301, with which external signing device 340 signs authentication challenges, and public key 302.

The above may provide a wallet infrastructure for Web3 which may be utilized by, e.g., cybersecurity companies. From banks to gaming studios, developer teams may have to rely on such a decentralized signing network to deploy, e.g., in-app wallets which may so abstract away the high complexity level blockchains and key management normally pose, especially for persons who are not accustomed to working with such. This way, an application programming interface and software development kit (API/SDK) may be provided, which may enable developers with little to no blockchain experience to build wallet onboarding interfaces that feel like Web2, while the privacy and custodial controls of Web3 may be preserved.

Part of such an architecture may be a cryptographic signer network based on Multi Party Computation (MPC) and Threshold Signature Scheme (TSS). Here, the signers may hold key shares, which may be created via Distributed Key Generation (DKG) and sign transactions verified through Zero-Knowledge Proofs (ZKP) by communicating over encrypted channels. Using this approach, the private keys immutably attached to the blockchain may be never reconstituted in memory or on disk throughout the entire lifecycle of the wallet.

Any given wallet provider may be positioned on a scale from 'do-it-yourself' to 'fully-managed-solution'. This way, products such as Software as a Service SaaS may be endowed with such key management and security, while the provider of the product may be committed to creating decentralized technology designed to remove single points of failure and trust, which may ensure a high business continuity.

In market segments such as Decentralized Finance (DeFi), gaming, and other NFT-related projects, there has been significant demand for a solution which may delegate the custodial responsibility to the end-user, while preserving a seamless, Web2-like onboarding experience to encourage high conversion rates. In order to meet this demand, the above proposed design for a configuration which may be called Delegated Signing (DS), which may give end-users the benefits of a self-custodial wallet like MetaMask, without forcing them to securely persist a 24-word seed phrase or any other mnemonic secret, which may be viewed as a point of failure. The architecture behind the Delegated Signing has been described above in which custody may be delegated via an API signing secret in the form of a assigning challenge. Below, it is described how wallets may be recovered in the case of lost devices.

In the above described procedure, generated key shares may be encrypted and then persisted in databases across one or multiple cloud servers, e.g., Amazon Web Server (AWS) regions and/or availability zones. This geographic distribution may help to ensure business continuity. This network may be decentralized further by contracting with permissioned partners to host key shares and sign transactions.

Note that the discussed signing challenges do not mean the same thing as an API key. Calls to the application provider server may also require an API-type key in the form of a JWT (JSON Web Token), passed in the authorization layer as a 'Bearer token'. This may be part of standard API-type security. This token may be received with every request and validated. Conversely, the provider standardly does not have access to an end user's signing challenge itself; only the signatures it may create may be validated. This serves to guarantee that even a bad actor within the provider's system could not impersonate an end user to steal funds.

Although all key shares may be maintained in the signing network, this generally does not make the provider of the service a custodian. Custodianship is generally determined by the ability to move assets on-chain. The service provider does not have access to key shares, and cannot call the application provider server to impersonate a client or an end-user, since they would not be able to provide a valid signature. The signer devices may be encapsulated in an isolated compute environment, such as AWS Nitro Enclaves, to further guarantee that key shares are not accessible.

It can be avoided that end users of wallets in the above architecture are locked into the platform. End users may create a wallet using any other product or service, and transfer their assets out of the above architecture seamlessly via the application provider server at any time. The ability to export private keys may be an additional feature of the architecture. Once keys may be exported, the provider of the service may however no longer be able to guarantee the security of the wallet, which may render the wallet therefore no longer usable within the platform after the export.

Figure 4A:
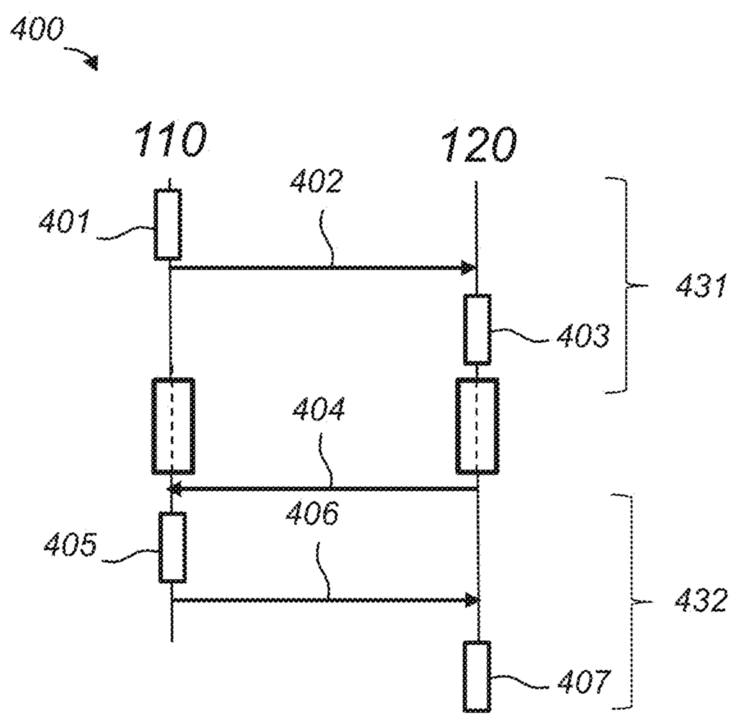

FIG. 4*a* schematically shows an example of a sequence diagram 400 for a system for recovery of access to an account on which the transactions may take place, and/or of access to blockchain-secured assets, for an end user device 110 and an application provider server 120. For example, these devices may be as described with reference to FIGS. 1*a*-1*e*. End user device 110 and application provider server 120 may be configured to communicate with each other over an authenticated channel, and preferably, also a confidential channel.

An end user may use several end user devices 110.1, 110.2, 110.3 to obtain access to an account on which the transactions may take place which is associated with the end user. An end user device on which an end user has obtained access to the account associated with the end user may get lost or compromised. In such cases, access to the account may be recovered by the end user in the following recovery process, in which original public key 302, also known as first public key 302, which is used by end user device 110 to sign challenges and by application provider server to verify these signed challenges, may have to be replaced by a replacement public key, also known as a second public key.

Application provider server 120 may store original public key 302, which may be associated with asymmetric key pair 301, 302, which may be used by end user device 110 to sign authentication challenges. Application provider server 120 may store original public key 302 in an internal key storage. Application provider server 120 may store original public key 302 in an external key storage, which may be secured, and application provider server 120 may be authorized to have access to the external key storage.

In a set-up phase 431 of the recovery process, end user device 110 may be configured to encrypt a recovery private key 413 using a recovery symmetric key 411. Recovery symmetric key 411 may be created on end user device 110, using a symmetric-key algorithm such as a block-cipher algorithm, e.g., triple-DES or AES, during action 401. Recovery symmetry key 411 may also be generated by application provider server 120. Recovery symmetry key 411 may also be generated by a recovery symmetric key generating device, which may be an internal device inside end user device 110 or application provider server 120, or an external recovery symmetric key generating device. Recovery private key 413 may correspond to recovery asymmetric key pair 412, 413, which may comprise recovery private key 413 as well as recovery public key 412. Recovery asymmetric key pair 412, 413 may be generated by end user device 110 or application provider server 120. Recovery asymmetric key pair 412, 413 may also be generated by a recovery asymmetric key generating device, which may be an internal device inside end user device 110 or application provider server 120, or an external recovery symmetric key generating device. End user device 110 may be configured to store recovery symmetric key 411. End user device 110 may store recovery symmetric key 411 in a key storage, e.g., an internal key storage, or an external key storage.

End user device 110 may further be configured to share the recovery asymmetric key pair 412, 413, comprising encrypted recovery private key 413 as well as recovery public key 412, with application provider server 120 in message 402. End user device 110 may be configured to erase encrypted recovery private key 413 and/or recovery public key 412 from its storage after sharing it with application provider server 120. Message 402 may further comprise one or more of an identification number associated with the end user, an identification number associated with an account, like a cryptocurrency amount, e.g., an account number, etc.

Application provider server 120 may be configured to receive message 402. Application provider server 120 may further be configured to store the recovery asymmetric key pair 412, 413, comprising the encrypted recovery private key and the recovery public key, in action 403. Application prover server 120 may be configured to store recovery asymmetric key pair 412, 413, in a key storage, e.g., an internal key storage, or an external key storage. Application provider server 120 may store the different keys, the recovery public key and the encrypted recovery private key, in different storages. The one or more of an identification number associated with the end user, an identification number associated with the account, etc. which may be shared with application provider server in message 402 may be stored by application provider server in action 203. Application provider server 120 may also be able to obtain such information by retrieving such data, for example, from a database storing profile information of end users, a template, or a type of an overview such as a table, etc. Accordingly, the application provider server 120 may be able to generate such data or parts of such data without the use of end user device 110.

In an recovery phase 432 of the recovery process, application provider server 120 may be configured to share encrypted recovery private key 412 with end user device 110 in message 404. In message 404, application provider server 120 may further be configured to send a recovery challenge to end user device 110. Application provider server 120 may send message 404, which comprises the encrypted recovery private key and a recovery challenge, in response to an action, such as a recovery request sent from an end user, which may send it using, e.g., end user device 110 or a different end user device. In order to send the recovery challenge, application provider server 120 may obtain the recovery challenge therefor. Obtaining a recovery challenge may comprise generating the recovery challenge. The recovery request may be generated by end user device 110, or by application provider server 120 in response to a message from end user device. The recovery challenge may also be created by an external recovery challenge generating device, e.g., by a trusted party, e.g., upon request by application provider server 120. For example, a recovery challenge may comprise a nonce, a random number, or the like. The recovery challenge may be at least 80 bit longer, preferably, at least 128 bit long, more preferably, 256 bit long. Before creating the recovery request, application provider server 120 may verify whether information corresponding to the identity of the end user, such as an identification number application provider server may have obtained and stored before in action 203 may correspond to any identifying information in the recovery request it may receive from end user device 110.

In action 405, end user device 110 may be configured to receive message 404. End user device 110 may be further configured to decrypt the encrypted recovery private key in action 405, using recovery symmetric key 411 end user device 110 has created and stored before action 401, using a symmetric-key algorithm. In action 405, end user device 110 may further be configured to sign the recovery challenge. End user device 110 may sign the recovery challenge using the decrypted recovery private key. End user device 110 may further be configured to sign a replacement public key, which may be associated with a new asymmetric key pair. By doing so, end user device 110 may use the new asymmetric key pair for signing future authentication challenges. The replacement public key may be generated by end user device 110, or application provider server 120 and shared with end user device 110. Application provider server 120 may have shared the replacement public key with end user device 110 in message 404. The replacement public key may also have been generated by an internal or external key-generating device.

End user device 110 may be configured to send the signed recovery challenge together with the replacement public key to application provider server 120 in message 406. Application provider server 120 may be configured to receive message 406. In response, application provider server 120 may be configured to validate the signed recovery challenge in action 407. Application provider server may validate the signed recovery challenge by verifying whether the recovery challenge is correctly signed. Application provider server 120 may then verify whether information corresponding to the identity of the end user, such as an identification number or account number, which application provider server 120 may have obtained and stored before in action 203, may correspond to any identifying information in the recovery request it may receive from end user device 110. This verification may take place via checking whether this identifying information obtained during action 203 and in message 402 agrees with each other, e.g., by looking it up in a database storing information regarding end user device 110 and corresponding keys, similarly to e.g., action 212.

In action 407, application provider server 120 may be configured to replace original public key 302 with the replacement public key. Application provider server 120 may replace original public key 302 for signing challenges as described in FIG. 3*a* with the replacement public key if the recovery challenge is correctly signed. This way, the end user is provided with new user credentials. Application provider server 120 may delete original public key 302 from its memory, such that information cannot be traced back to original public key 302 and its relation to end user device 110. Application provider server 120 may update a database with the new information regarding end user device 110 and the replacement public key. End user device may also update a similar database storing information on itself and corresponding keys. Now, in the current situation it is possible to perform a method for delegated signing as the one described in claim 1 again.

Many architectures which are used in dealing with cryptocurrencies have proven time and time again that it is a very difficult process to manage keys in a safe manner; still, there are instances of bitcoin developers who lose their funds. Using the recovery process as described above, end users are not required to indefinitely safekeep a 24-word seed to guarantee access to their assets, which is the case for most architectures in the state of the art. Next to the advantages of the architecture itself, thanks to the immutability of the usage of authentication challenges instead of a direct private key to access cryptocurrency amounts, when they are stolen, they can be revoked; and when they are lost, they can be re-established. In other words, there is less risk associated with loss, since it is not irreversible, but refreshable. This adds to privacy and security.

Figure 4B:
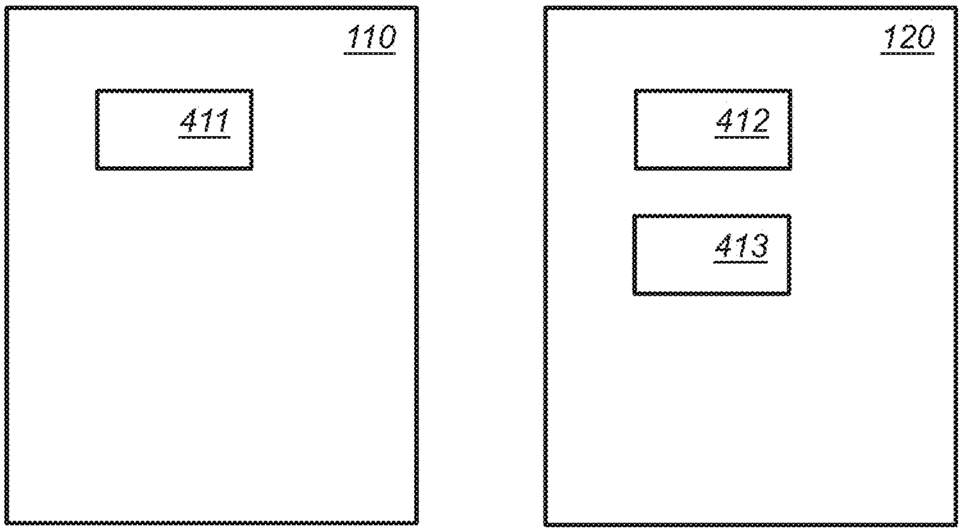

FIG. 4*b* schematically shows an end user device 110 and an application provider server 120 as discussed in FIG. 4*a*. In fact, it shows the situation right after the set-up phase 431

End user device 110 may comprise a key storage. Application provider server 120 may comprise a key storage as well. In a set-up phase 431, end user device 110 may be configured to create a recovery symmetric key 411, using a symmetric-key algorithm such as triple-DES or AES. Recovery symmetry key 411 may also preferably be generated by a recovery symmetric key generating device, which may be an internal device inside end user device 110 or application provider server 120, or an external recovery symmetric key generating device. Recovery symmetry key 411 may best be solely stored in a physical manner, e.g., on paper or on a USB stick. With recovery symmetric key 411, end user device 110 may be configured to encrypt a recovery private key 413 which may correspond to a recovery asymmetric key pair 412, 413. Recovery asymmetric key pair 412, 413 may comprise recovery private key 413 and a recovery public key 412. Recovery asymmetric key pair 412, 413 may typically be generated by end user device 110. Recovery asymmetric key pair 412, 413 may also be generated by a recovery asymmetric key generating device, which may be an internal device inside end user device 110 or application provider server 120, or an external recovery symmetric key generating device. Application provider server 120 may be configured to store the recovery asymmetric key pair 412, 413, comprising the encrypted recovery private key 413 and recovery public key 412. End user device 110 may then be configured to erase recovery private key 413 from its storage. FIG. 4*b* shows the situation after the instance end user device 110 has deleted encrypted recovery private key 413 and/or recovery public key 412 from its storage after sharing encrypted recovery private key 413 with application provider server 120.

Note that recovery symmetry key 411 may also be generated by application provider server 120. Recovery asymmetric key pair 412, 413 may also be generated by application provider server 120.

Note that an end user wallet recovery code as mentioned above is not the same thing as a seed phrase. A seed phrase may recover a private key directly, by which it may enable full access to all assets immediately. This means that if a seed phrase may be compromised, all assets could be lost. In contrast, in the recovery process described above the application provider servers may be in control of the end user recovery process. When a recovery is requested, for example an email may be sent to verify the user's identity. Additionally, customer administration staff may be notified, e.g., If the wallet may contain assets above a given threshold. If a recovery is successfully executed, the wallet and all assets may remain locked for a certain amount of time, e.g., 48 hours, while the original owner may be contacted to ensure they initiated the process. These controls may serve to protect the end user from both attackers and from themselves.

Aside from the above-mentioned recovery process, a more comprehensive disaster recovery plan may be presented in the above architecture. Alternatively, some end users may be required to go through a KYC process. This process may be re-initiated for users who have lost access to their devices, in order to validate their identities and re-establish credentials.

Figure 5:
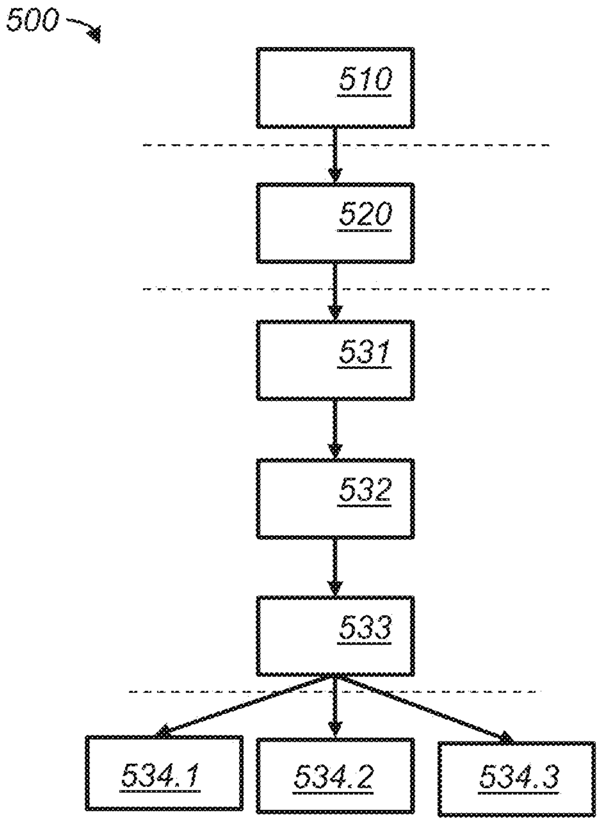

FIG. 5 schematically shows an example of an architecture 500 of a system for delegated signing. FIG. 5 shows an end user device 510, an application provider server 520, and components of a signing system in 531, 532, 533, and possibly internal, possibly external components of a signing system in 534.1, 534.2, 534.3. For example, these devices and systems could be as described with reference to FIGS. 1*a*-1*e*. End user device 510, application provider server 520, and components 531, 532, 533, 5341. 534.2, 534.3 may be configured to communicate with each other over an authenticated channel, and preferably, also a confidential channel.

In the architecture, custody may be determined by the authentication challenges, not the private key used by end user device 510 to interact with the rest of the system. This aspect may mitigate the threat of the loss of funds due to user errors. The custodianship of the authentication challenges may be delegated to the end users: for example, challenges stored in the secure enclave of devices such as smartphone, which may be accessible only via, for example, biometrics. Signed authentication challenges, which may be forwarded by application provider server 520, may be the only way to move funds on chain.

Architecture 500 may ensure that transactions may only be executed via application provider server 120. Therefore, the security of application server 120 may become paramount. To this end, a multi-level authentication, authorization, and governance architecture may be provided by a wallet provider authentication layer 531, a wallet provider authorization layer 532 and a wallet provider coordination layer 533 in order to ensure full accountability of the usage of application provider server 120. At the heart of this architecture are the authentication challenges, which ultimately dictate custody of the assets in a wallet.

The authentication infrastructure in wallet provider authentication layer 531 may require that all requests to the application provider server which may be capable of changing state in the system or on chain, for example, post, put, and delete requests specifically, must be signed by a challenge known only to the custodian of the assets. Wallet provider authentication layer 531 may validate the signature and write an immutable log of the transaction, cryptographically proving the source of the application provider server call. This approach may be described as Accountable Multiparty Computation (AMPC). In a configuration, custodianship may be delegated to an end user by building an onboarding flow in which the end user may generate and persist an authentication challenge on end user device 510. In order to enable building frictionless user experiences, a protocol such as the WebAuthn 3.0 password-less open protocol, see fido2-lib by WebAuthn, may be implemented WebAuthn may be natively integrated into all major browsers and mobile operating systems, exposing seamless access to biometrics for instance. This may enable an onboarding flow such as the following:

1. A user may register with a product using the credentials of their choice, including a social login.
2. The user may create a wallet, establishing signing credentials via biometrics. This is executed via a simple application provider server call.
3. The user may purchase or transfer assets into the wallet. When they want to execute an outbound transaction, they verify via biometrics again, silently signing the transaction on the back end.

The verification whether the authentication challenge is correctly signed may be carried out by wallet provider authentication layer 531. This verifying of the authentication challenge may comprise checking in a storage of signing system 130 if the signed authentication challenge corresponds to the authentication challenge sent earlier. For example, the storage of signing system 130 may store the received transaction data together with the obtained authentication challenge. For example, the received transaction data may be stored in a table, which is sorted based on one or more of IP addresses, chronological order, whether or not verification has taken place, or in a hash table, sorted on the hash of the transaction data, or the like. If the challenge is not correctly signed according to the verifying whether the authentication challenge is correctly signed, wallet provider authentication layer 531 may initiate rejection of the transaction.

The verification whether end user device 510 is authorized to perform a transaction may be carried out by wallet provider authorization layer 532. For example, end user device 510 and/or an end user may be identified from the authentication of the authentication challenge. The verifying of the authorization of the end user may happen using one or more of a table, a database and other types of data storage, where data on the end user and the wallet is stored. Verifying may take place by checking whether the data on the end user and data on the wallet agree with each other and may confirm the end user is indeed authorized to perform the transaction to which the authentication challenge corresponds. The data on the end user and the wallet may comprise an IP address of the end user device, identification data for the end user or the end user device, identification data for the wallet, like a corresponding account or digital cryptocurrency amount, etc. If end user device 110 is not authorized according to the verifying whether end user device 110 is authorized, wallet provider authorization layer 532 may send a message signing system 130 may initiate rejection of the transaction.

Instructing a plurality of transaction signing devices 534.1, 534.2, 534.3 may be carried out by wallet provider coordination layer 533. The instruction may entail to sign the transaction data with a multi-party computation shared private key corresponding to the corresponding wallet. Signing devices 534.1, 534.2, 534.3 may hold key shares, which may be created using a distributed key generation, or using a trusted party, which may be configured for a threshold signature scheme. Signing devices 534.1, 534.2, 534.3 may use these key shares for the signing of the transaction data. The signing system may comprise signing devices 534.1, 534.2, 534.3. Signing devices 534.1, 534.2, 534.3 may be external signing devices.

Architecture 500 may relieve a client from the regulatory burden of financial custodianship by ensuring that they may not have the ability to manipulate the assets of end users on chain. This is cryptographically proven, given that they may never have access to the signing secret kept by a user which may be required to execute transactions against application provider server 520.

The devices 534.1, 534.2, 534.3 in the signer network provider may constitute a decentralized signer network. A cluster of key shares may be encrypted and stored in the decentralized signer network. The signer network may be a permissioned network. Signing devices 534.1, 534.2, 534.3 may implement cryptographic protocols. The cryptographic protocols may be peer-reviewed cryptographic protocols. The cryptographic protocols may be cryptographic protocols for distributed key generation and threshold signatures; for example, GG18. Signing devices 534.1, 534.2, 534.3 may be spread across multiple data centers in a permissioned network of data center providers: for example, Tier 3+ data centers such as tier 4 data centers. Signing devices 534.1, 534.2, 534.3 may be spread across multiple geographical regions, to ensure high levels of service, availability, fault-tolerance, and business continuity. The decentralized custody network may be extended to include permissioned partners, who may be compensated for generating keys and signing transactions. It may be ensured that no single entity hold or possess a sufficient threshold of key shares for any given wallet in order to move funds. This means that the total number of key shares may be required to move assets on-chain. By using built-in recovery capabilities provided by threshold cryptography, such as key share refresh, key share rotation, etc., as well as a wide range of security controls and monitoring tools from code deployments to continuous maintenance activities, This way, a high level of governance neutrality may be guaranteed and it may be demonstrated that the private key does not exist in its full format and that no single party can recover it unilaterally. Instead, the design scheme of architecture 500 may suggest that the control of application provider server 520, which may be materialized by the keys in possession of application provider server 520 and authentication challenges may be the new proof of custodianship, as it is what may provide ownership over the signing flows of asset transfers. Using architecture 500, platforms may decide whether they may want to keep the application provider server control on-premise: e.g., in custodial mode; or delegate it partially or totally to the end user devices, exempting themselves from any custodial responsibility: e.g., in end-user-custodial mode, or self-custodial mode.

Most self-custodial wallets, such as MetaMask or Ledger, require users to indefinitely safekeep a 24-word seed phrase to guarantee access to their assets. Even early adopters of cryptocurrencies who have become very familiar and perceptive with the technical constraints of self-custodial wallets have proven time and again incapable of managing keys safely, as seen most recently in the unfortunate case of a bitcoin core developer losing his funds. By leveraging an authentication challenge as a proxy for the blockchain private key, the risks described above may be substantially mitigated. Unlike a blockchain private key, the authentication challenge may not be immutable. If it may be stolen, it may be revoked. If it may be lost, it may be re-established. One may compare the properties between a blockchain-bound private key, e.g. private key 301, and an application provider server key according to an embodiment as follows:

| | Regular private key | Application provider server key |
|---|---|---|
| Risk of loss | Irreversible | Refreshable |
| Accessibility | Unlimited | Time-limited sessions |
| Observability | Untraceable | Usage monitoring and controls |
| Prevention | Irrevocable | Manually and automatically revocable in the case of abnormal activity suspected |
| Privacy | Activity recorded on-chain | Activity not exposed to the chain. |
| Security | Limited factors of authentication | Additional authentication factors enabled on top of end-user auth and signing |

Also useful for a transaction, possibly without verifying authorization, is the following embodiment for a system for delegated signing:

A system for delegated signing, the system comprising one or more end user devices, one or more application provider servers and a signing system, wherein the one or more end user devices comprise one or more processors and one or more storage devices storing instructions that, when executed by the one or more processors, cause the one or more processors to perform operations for initiating a transaction associated with the end user device, receiving from the application provider server an authentication challenge for the transaction, signing the authentication challenge, and returning the signed authentication challenge to the application provider server, the one or more application provider servers comprise one or more processors and one or more storage devices storing instructions that, when executed by the one or more processors, cause the one or more processors to perform operations for obtaining transaction data describing the transaction, forwarding the transaction data to the signing system for authentication and authorization, receiving the authentication challenge from the signing system, forwarding the authentication challenge to the end user device, receiving the signed authentication challenge from the end user device, and sending the signed authentication challenge to the signing system, and the signing system comprises one or more processors and one or more storage devices storing instructions that, when executed by the one or more processors, cause the one or more processors to perform operations for receiving the transaction data from the application provider server, sending the authentication challenge to the application provider server, receiving the signed authentication challenge from the application provider server, verifying whether the authentication challenge is correctly signed, instructing a plurality of signing devices to sign a message derived from the transaction data with a private key corresponding to the end user device using a multi-party signing algorithm.

The recovery process mentioned above and described in FIG. 4*a* Is also useful for recovering all types of private keys, even without delegated signing, or using authentication challenges. For example, in an embodiment, we have the following system for such a recovery process:

A system, comprising an end user device and an application provider server, wherein the application provider server stores a first public key associated with a first asymmetric key pair associated with the end user device, wherein in a set-up phase:

the end user device is configured to encrypt a recovery private key using a recovery symmetric key created on the end user device, the recovery private key corresponding to a recovery asymmetric key pair, comprising a recovery private key and a recovery public key, and the application provider server is configured to store the encrypted recovery private key and the recovery public key, and in a recovery phase, the application provider server and the end user device are configured for the following:

the application provider server shares the encrypted recovery private key with the end user device, the application provider server sends a recovery challenge to the end user device, the end user device decrypts the recovery private key, using the recovery symmetric key, the end user device signs the recovery challenge using the decrypted recovery private key, the end user device signs a second public key associated with a second asymmetric key pair, associated with the end user device, the end user device sends the signed recovery challenge and the second public key to the application provider server, the application provider server validates the signed recovery challenge, and the application provider server replaces the first public key with the second public key.

Figure 6A:
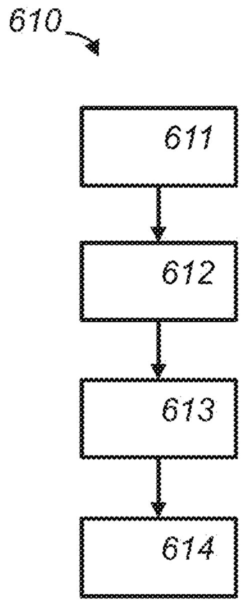

FIG. 6*a* schematically shows an example of an embodiment of a delegated signing method 610 for an end user device 110. The method may comprise initiating 611 a transaction associated with end user device 110 by end user device 110. A phase 612 may comprise receiving from application provider server 120 an authentication challenge for the transaction by end user device 110. A phase 613 may comprise signing the authentication challenge by end user device 110. A phase 614 may comprise returning the signed authentication challenge to application provider server 120 by end user device 110.

Figure 6B:
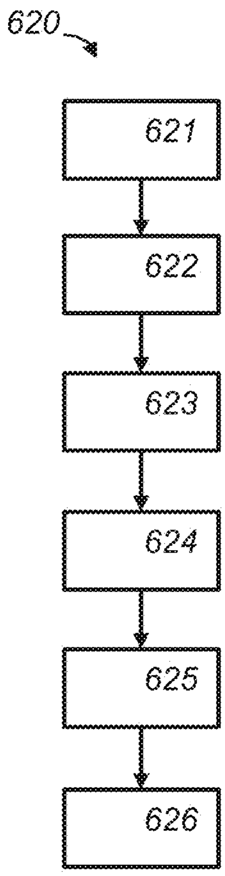

FIG. 6*b* schematically shows an example of an embodiment of a delegated signing method 620 for an application provider server 120. A phase 621 may comprise obtaining transaction data by application provider server 120, the transaction data describing a transaction associated with end user device 110. A phase 622 may comprise forwarding the transaction data to signing system 130 by application provider server 120 for authentication and authorization. A phase 623 may comprise receiving an authentication challenge from signing system 130 by application provider server 120. A phase 624 may comprise forwarding the authentication challenge to end user device 110 by application provider server 120. A phase 625 may comprise receiving the signed authentication challenge from end user device 110 by application provider server 120. A phase 626 may comprise sending the signed authentication challenge to signing system 130 by application provider server 120.

Figure 6C:
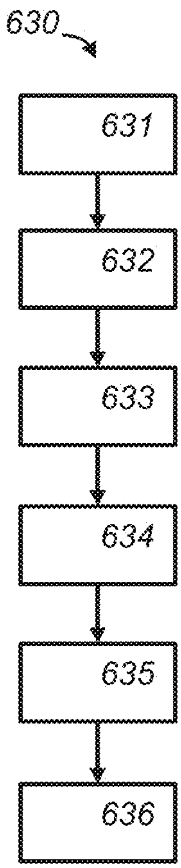

FIG. 6*c* schematically shows an example of an embodiment of a delegated signing method 630 for a signing system 130. A phase 631 may comprise receiving transaction data from application provider server 120 by signing system 130, the transaction data describing a transaction associated with end user device 110. A phase 632 may comprise sending an authentication challenge to application provider server 120 by signing system 130. A phase 633 may comprise receiving the signed authentication challenge from application provider server 120 by signing system 130. A phase 634 may comprise verifying whether the authentication challenge is correctly signed by signing system 130. A phase 635 may comprise verifying whether end user device 110 is authorized to perform the transaction by signing system 130. A phase 636 may comprise instructing a plurality of signing devices 130.1, 130.2, 130.3 to sign the transaction data with a multi-party computation sharded private key corresponding to the transaction by signing system 130.

Many different ways of executing a method as depicted in FIGS. 6*a-c* are possible, as will be apparent to a person skilled in the art. For example, the order of the phases can be performed in the shown order, but the order of the phases can be varied, or some phases may be executed in parallel.

Moreover, in between phases other method phases may be inserted. The inserted phases may represent refinements of the method such as described herein, or may be unrelated to the method. For example, some phases may be executed, at least partially, in parallel. Moreover, a given phase may not have finished completely before a next phase is started. Embodiments of the method may be executed using software, which comprises instructions for causing a processor system to perform phases 420, 430, 430 of method 400. Software may only include those phases taken by a particular sub-entity of the system. The software may be stored in a suitable storage medium, such as a hard disk, a memory, an optical disc, etc. The software may be sent as a signal along a wire, or wireless, or using a data network, e.g., the Internet. The software may be made available for download and/or for remote usage on a server.

It will be appreciated that the presently disclosed subject matter also extends to computer programs, particularly computer programs on or in a carrier, adapted for putting the presently disclosed subject matter into practice. The program may be in the form of source code, object code, a code intermediate source, and object code such as partially compiled form, or in any other form suitable for use in the implementation of an embodiment of the method. An embodiment relating to a computer program product comprises computer executable instructions corresponding to each of the processing phases of at least one of the methods set forth. These instructions may be subdivided into subroutines and/or be stored in one or more files that may be linked statically or dynamically. Another embodiment relating to a computer program product comprises computer executable instructions corresponding to each of the devices, units and/or parts of at least one of the systems and/or products set forth.

Figure 7A:
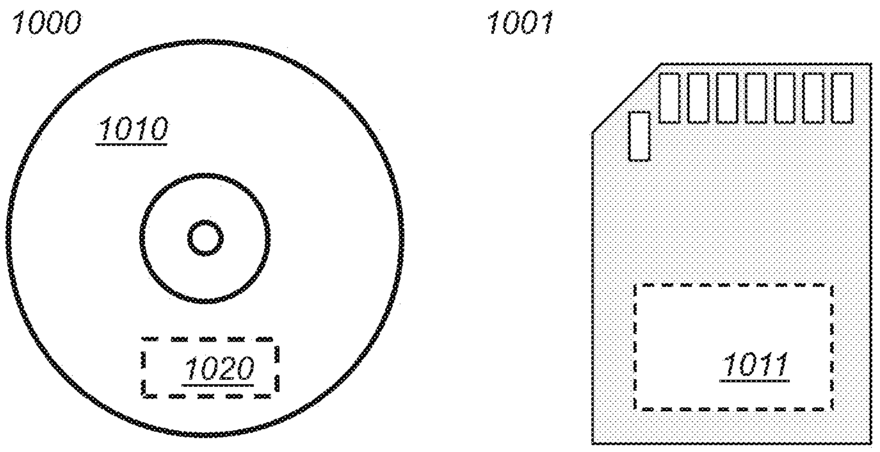

FIG. 7*a* schematically shows a computer readable medium 1000 having a data 1010 stored thereon, and a computer readable medium 1001 also having a data 1011 stored thereon. Computer readable medium 1000 is shown in the form of an optically readable medium. Computer readable medium 1001 is shown in the form of an electronic memory, in this case a memory card. The stored data 1010 and 1011 may represent computer programs which may be comprised of instructions, which when executed by a processor system, cause a processor system to perform an embodiment of a method, according to an embodiment as described in FIGS. 6*a-c*. The computer programs 1010 and 1011 may be embodied on the computer readable medium 1000 as physical marks or by magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer programs 1010 and 1011 comprise instructions for causing a processor system to perform an embodiment of one of the methods as depicted in FIGS. 6*a-c*.

Figure 7B:
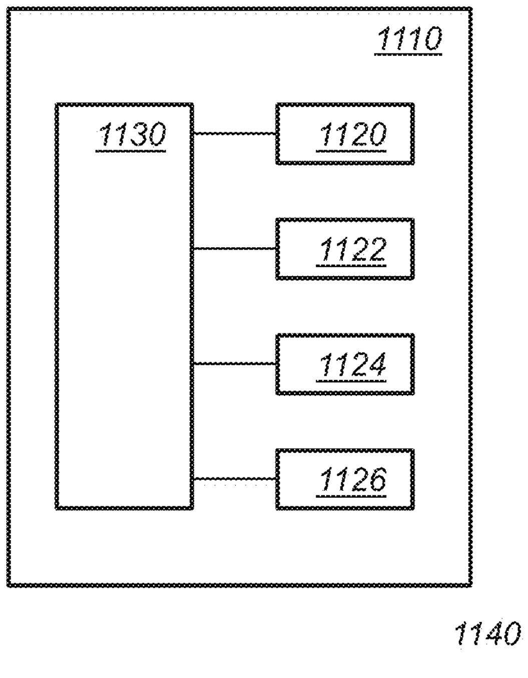

FIG. 7*b* schematically shows a representation of a processor system according to an embodiment. The processor system 1110 comprises a processing unit 1120, e.g., a CPU, for running computer program components to execute a method according to an embodiment and/or implement its modules or units. The processor system 1110 comprises a memory 1122 for storing programming code, data, etc. Part of memory 1122 may be read-only. The processor system 1110 may comprise a communication element 1126, e.g., an antenna, connectors or both, and the like. The processor system 1110 may comprise a dedicated integrated circuit 1124 for performing part or all of the processing defined in the method. The processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

While system 1110 is shown as including one of each described component, the various components may be duplicated in various embodiments. For example, the processing unit 1120 may include multiple microprocessors that are configured to independently execute the methods described herein or are configured to perform phases or subroutines of the methods described herein such that the multiple processors cooperate to achieve the functionality described herein. Further, where the system 1110 is implemented in a cloud computing system, the various hardware components may belong to separate physical systems. For example, the processing unit 1120 may include a first processor in a first server and a second processor in a second server.

It should be noted that the above-mentioned embodiments illustrate rather than limit the presently disclosed subject matter, and that those skilled in the art will be able to design many alternative embodiments.

In the claims, any reference signs placed between parentheses shall not be construed as limiting the claim. Use of the verb 'comprise', and its conjugations does not exclude the presence of elements or phases other than those stated in a claim. The article 'a' or 'an' preceding an element does not exclude the presence of a plurality of such elements. Expressions such as "at least one of" when preceding a list of elements represent a selection of all or of any subset of elements from the list. For example, the expression, "at least one of A, B, and C" should be understood as including only A, only B, only C, both A and B, both A and C, both B and C, or all of A, B, and C. The presently disclosed subject matter may be implemented by hardware comprising several distinct elements, and by a suitably programmed computer. In the device claim enumerating several parts, several of these parts may be embodied by one and the same item of hardware. The mere fact that certain measures are recited in mutually different dependent claims does not indicate that a combination of these measures cannot be used to advantage.

In the claims references in parentheses refer to reference signs in drawings of exemplifying embodiments or to formulas of embodiments, thus increasing the intelligibility of the claim. These references shall not be construed as limiting the claims.

The invention claimed is:

1. A system for key recovery in delegated signing for recovering access in case of a compromised signing key, the system comprising one or more end user devices, one or more application provider servers and a signing system, wherein (a) the one or more end user devices comprise one or more processors and one or more storage devices storing instructions that, when executed by the one or more processors, cause the one or more processors to perform operations for:

(a1) initiating a transaction associated with the end user device, (a2) receiving from the application provider server an authentication challenge for the transaction, (a3) signing the authentication challenge, and (a4) returning the signed authentication challenge to the application provider server, and wherein (b) the one or more application provider servers comprise one or more processors and one or more storage devices storing instructions that, when executed by the one or more processors, cause the one or more processors to perform operations for:

(b1) obtaining transaction data describing the transaction, wherein the transaction data is in digital form, (b2) forwarding the transaction data to the signing system for authentication and authorization, (b3) receiving the authentication challenge from the signing system, (b4) forwarding the authentication challenge to the end user device, (b5) receiving the signed authentication challenge from the end user device, and (b6) sending the signed authentication challenge to the signing system, and wherein (c) the signing system comprises one or more processors and one or more storage devices storing instructions that, when executed by the one or more processors, cause the one or more processors to perform operations for:

(c1) receiving the transaction data from the application provider server, (c2) sending the authentication challenge to the application provider server, (c3) receiving the signed authentication challenge from the application provider server, (c4) verifying whether the authentication challenge is correctly signed, (c5) verifying whether the end user device is authorized to perform the transaction, and (c6) instructing a plurality of signing devices to sign a message derived from the transaction data with a private key corresponding to the end user device using a multi-party signing algorithm, wherein an application provider server stores a first public key associated with a first asymmetric key pair, used by an end user device for signing authentication challenges, wherein (1) in a set-up phase:

(1a) the end user device is configured to encrypt a recovery private key using a recovery symmetric key created on the one or more end user devices, the recovery private key corresponding to a recovery asymmetric key pair, comprising a recovery private key and a recovery public key, and (1b) the application provider server is configured to store the encrypted recovery private key and the recovery public key, and (2) in a recovery phase, the application provider server and the end user device are configured for the following in order to recover access for the end user device in case of a compromised signing key of the end user device:

(2a) the application provider server shares the encrypted recovery private key with the end user device, (2b) the application provider server sends a recovery challenge to the end user device, (2c) the end user device decrypts the recovery private key, using the recovery symmetric key, (2d) the end user device signs the recovery challenge using the decrypted recovery private key, (2e) the end user device signs a second public key associated with a second asymmetric key pair, used by the end user device for signing new authentication challenges, (2f) the end user device sends the signed recovery challenge and the second public key to the application provider server, (2g) the application provider server validates the signed recovery challenge, and (2h) the application provider server replaces the first public key with the second public key, thereby recovering access for the end user device.

2. The system as in claim 1, wherein the one or more end user devices comprise a key storage in secure hardware storing a private key associated with an asymmetric key pair, and the one or more end user devices are further configured to sign the authentication challenge using the private key.

3. The system as in claim 1, wherein the end user device is configured to connect to an external signing device, and the end user device is further configured to sign the authentication challenge using the external signing device.

4. The system as claim 1, wherein the signing system is configured to execute in a set-up phase a distributed key generation, creating a plurality of key shares configured for a threshold signature scheme, and to distribute the plurality of key shares to the plurality of signing devices, a signing device comprises a key storage storing a key share of the plurality of key shares, one or more processors, and one or more storage devices storing instructions that, when executed by the one or more processors, cause the one or more processors to perform operations for:

(i) retrieving the key share, and (ii) generating a signature share for the transaction data, and wherein the signing system is configured to combine a plurality of signature shares generated by the plurality of signing devices into a combined signature according to the threshold signature scheme.

5. The system as in claim 1, wherein the signing system is configured to provide the signed authentication challenge to the plurality of signing devices, and the signing devices are configured to validate the signed authentication challenge.

6. The system as in claim 4, wherein the combined signature is not returned to the end user device, and wherein the signing system or the application provider server are configured to send the transaction data and the combined signature to an external service interface.

7. The system as in claim 1, wherein if the challenge is not correctly signed according to the verifying whether the authentication challenge is correctly signed, the signing system rejects the transaction, and/or if the end user device is not authorized according to the verifying whether the end user device is authorized, the signing system rejects the transaction.

8. An end user device, comprising one or more processors and one or more storage devices storing instructions that, when executed by the one or more processors, cause the one or more processors to perform operations for:

(i) initiating a transaction associated with the end user device, (ii) receiving from an application provider server an authentication challenge for the transaction, (iii) signing the authentication challenge, and (iv) returning the signed authentication challenge to the application provider server, and in a set-up phase, (v) encrypting a recovery private key using a recovery symmetric key created on the end user device, the recovery private key corresponding to a recovery asymmetric key pair, comprising a recovery private key and a recovery public key, and in a recovery phase, (vi) decrypting the recovery private key, using the recovery symmetric key, (vii) signing the recovery challenge using the decrypted recovery private key, (viii) signing a second public key associated with a second asymmetric key pair, used by the end user device for signing new authentication challenges, and (ix) sending the signed recovery challenge and the second public key to an application provider server for use in the system as in claim 1.

9. An application provider server, comprising one or more processors and one or more storage devices storing a first public key associated with a first asymmetric key pair, used by an end user device for signing authentication challenges, and instructions that, when executed by the one or more processors, cause the one or more processors to perform operations for:

(i) obtaining transaction data describing a transaction, wherein the transaction data is in digital form, (ii) forwarding the transaction data to a signing system for authentication and authorization, (iii) receiving an authentication challenge from the signing system, (iv) forwarding the authentication challenge to an end user device, (v) receiving the signed authentication challenge from the end user device, and (vi) sending the signed authentication challenge to the signing system, and in a set-up phase, (vii) storing an encrypted recovery private key and a recovery public key, and in a recovery phase, (viii) sharing the encrypted recovery private key with the end user device, (ix) sending a recovery challenge to the end user device, (x) validating a signed recovery challenge, and (xi) replacing the first public key with a second public key, for use in the system as in claim 1.

10. A signing system, comprising one or more processors and one or more storage devices storing instructions that, when executed by the one or more processors, cause the one or more processors to perform operations for:

(i) receiving transaction data from an application provider server, wherein the transaction data is in digital form, (ii) sending an authentication challenge to the application provider server, (iii) receiving the signed authentication challenge from the application provider server, (iv) verifying whether the authentication challenge is correctly signed, (v) verifying whether an end user device is authorized to perform a transaction, and (vi) instructing a plurality of signing devices to sign a message derived from the transaction data with a private key corresponding to the end user device using a multi-party signing algorithm, for use in the system as in claim 1.

11. A delegated signing and key recovery method for recovering access for an end user device in case of a compromised signing key, the method comprising:

(i) initiating a transaction associated with the end user device by the end user device, (ii) receiving from an application provider server an authentication challenge for the transaction by the end user device, (iii) signing the authentication challenge by the end user device, and (iv) returning the signed authentication challenge to the application provider server by the end user device, and in a set-up phase, (v) encrypting a recovery private key using a recovery symmetric key created on the end user device, the recovery private key corresponding to a recovery asymmetric key pair, comprising a recovery private key and a recovery public key, and in a recovery phase, in order to recover access for the end user device in case of a compromised signing key of the end user device, (vi) decrypting the recovery private key, using the recovery symmetric key, (vii) signing the recovery challenge using the decrypted recovery private key, (viii) signing a second public key associated with a second asymmetric key pair, used by the end user device for signing new authentication challenges, and (ix) sending the signed recovery challenge and the second public key to an application provider server.

12. A delegated signing and key recovery method for an application provider server for recovering access for an end user device in case of a compromised signing key, the application provider server storing a first public key associated with a first asymmetric key pair, used by the end user device for signing authentication challenges, the method comprising:

(i) obtaining transaction data by the application provider server, the transaction data describing a transaction associated with an end user device, wherein the transaction data is in digital form, (ii) forwarding the transaction data to a signing system by the application provider server for authentication and authorization, (iii) receiving an authentication challenge from the signing system by the application provider server, (iv) forwarding the authentication challenge to the end user device by the application provider server, (v) receiving the signed authentication challenge from the end user device by the application provider server, and (vi) sending the signed authentication challenge to the signing system by the application provider server, and in a set-up phase, (vii) storing an encrypted recovery private key and a recovery public key, and in a recovery phase, in order to recover access for the end user device in case of a compromised signing key of the end user device, (viii) sharing the encrypted recovery private key with the end user device, (ix) sending a recovery challenge to the end user device, (x) validating a signed recovery challenge, and (xi) replacing the first public key with a second public key, thereby recovering access for the end user device.

13. A delegated signing and key recovery method for a signing system for recovering access for an end user device in case of a compromised signing key, the method comprising:

(i) receiving transaction data from an application provider server by the signing system, the transaction data describing a transaction associated with the end user device, wherein the transaction data is in digital form, (ii) sending an authentication challenge to the application provider server by the signing system, (iii) receiving the signed authentication challenge from the application provider server by the signing system, (iv) verifying whether the authentication challenge is correctly signed by the signing system, (v) verifying whether the end user device is authorized to perform the by the signing system, and (vi) instructing a plurality of signing devices to sign a message derived from the transaction data with a private key corresponding to the end user device using a multi-party signing algorithm by the signing system, wherein the application provider server comprises one or more processors and one or more storage devices storing a first public key associated with a first asymmetric key pair, used by an end user device for signing authentication challenges, and instructions that, when executed by the one or more processors, cause the one or more processors to perform operations for:

(i) obtaining transaction data describing a transaction, (ii) forwarding the transaction data to a signing system for authentication and authorization, (iii) receiving an authentication challenge from the signing system, (iv) forwarding the authentication challenge to the end user device, (v) receiving the signed authentication challenge from the end user device, and (vi) sending the signed authentication challenge to the signing system, and in a set-up phase, (vii) storing an encrypted recovery private key and a recovery public key, and in a recovery phase, (viii) sharing the encrypted recovery private key with the end user device, (ix) sending a recovery challenge to the end user device, (x) validating a signed recovery challenge, and (xi) replacing the first public key with a second public key, and wherein the end user device comprises one or more processors and one or more storage devices storing instructions that, when executed by the one or more processors, cause the one or more processors to perform operations for:

(i) initiating a transaction associated with the end user device, (ii) receiving from the application provider server an authentication challenge for the transaction, (iii) signing the authentication challenge, and (iv) returning the signed authentication challenge to the application provider server, and in a set-up phase, (v) encrypting a recovery private key using a recovery symmetric key created on the end user device, the recovery private key corresponding to a recovery asymmetric key pair, comprising a recovery private key and a recovery public key, and in a recovery phase, (vi) decrypting the recovery private key, using the recovery symmetric key, (vii) signing the recovery challenge using the decrypted recovery private key, (viii) signing a second public key associated with a second asymmetric key pair, used by the end user device for signing new authentication challenges, and (ix) sending the signed recovery challenge and the second public key to an application provider server.

14. A non-transitory computer readable medium comprising data representing instructions, which when executed by a processor system, cause the processor system to perform the method according to claim 11.

15. A non-transitory computer readable medium comprising data representing instructions, which when executed by a processor system, cause the processor system to perform the method according to claim 12.

16. A non-transitory computer readable medium comprising data representing instructions, which when executed by a processor system, cause the processor system to perform the method according to claim 13.

* * * * *